United States Patent
Balzano

(10) Patent No.: US 6,193,414 B1
(45) Date of Patent: Feb. 27, 2001

(54) DUAL PROTECTED INSTANT TEMPERATURE DETECTOR

(76) Inventor: Alfiero Balzano, 11371 Monarch St., Garden Grove, CA (US) 92841

( * ) Notice: Subject to any disclaimer, the term of this patent is extended or adjusted under 35 U.S.C. 154(b) by 0 days.

(21) Appl. No.: 09/226,076

(22) Filed: Jan. 6, 1999

Related U.S. Application Data

(60) Provisional application No. 60/070,548, filed on Jan. 6, 1998.

(51) Int. Cl.[7] ........................................... G01K 1/00
(52) U.S. Cl. ............................................... 374/208
(58) Field of Search ................................. 374/208, 179, 374/165, 141, 147, 148; 136/221

(56) References Cited

U.S. PATENT DOCUMENTS

| | | | |
|---|---|---|---|
| 3,364,078 | * | 1/1968 | Ekstrom, Jr. et al. |
| 4,416,553 | * | 11/1983 | Huebscher ............................ 374/165 |
| 4,444,990 | * | 4/1984 | Villar .................................. 374/179 |
| 4,762,428 | * | 8/1988 | Villiger ............................... 374/208 |
| 4,762,979 | * | 8/1988 | Geoffroi .............................. 219/70.6 |
| 5,527,111 | * | 6/1996 | Lysen et al. ........................ 374/208 |
| 5,749,379 | * | 5/1998 | Stillwagon et al. ................. 374/141 |
| 5,794,799 | * | 8/1998 | Collins et al. ...................... 211/70.6 |

* cited by examiner

Primary Examiner—G. Bradley Bennett
Assistant Examiner—Gail Verbilsky
(74) Attorney, Agent, or Firm—Roger A. Marrs

(57) ABSTRACT

A temperature detector provides a base for supporting a stand which includes a cradle having an elongated open channel for supporting a heated curling iron. The cradle is resiliently carried on a post so that the cradle can move up and down over the terminating end of the post. The terminating end of the post includes a thermocouple which projects into and through an orifice in the cradle when the cradle is in the depressed or down position. Thus, the temperature of a weighted heating iron, for example, residing in the cavity of the cradle can be sensed by the thermocouple. The base includes support for a visual readout display of the temperature sensed and circuit means interconnects the display with the thermocouple. The thermocouple is protected from damage by the weighted object in the cradle by providing a resilient mount for the thermocouple within the post.

5 Claims, 1 Drawing Sheet

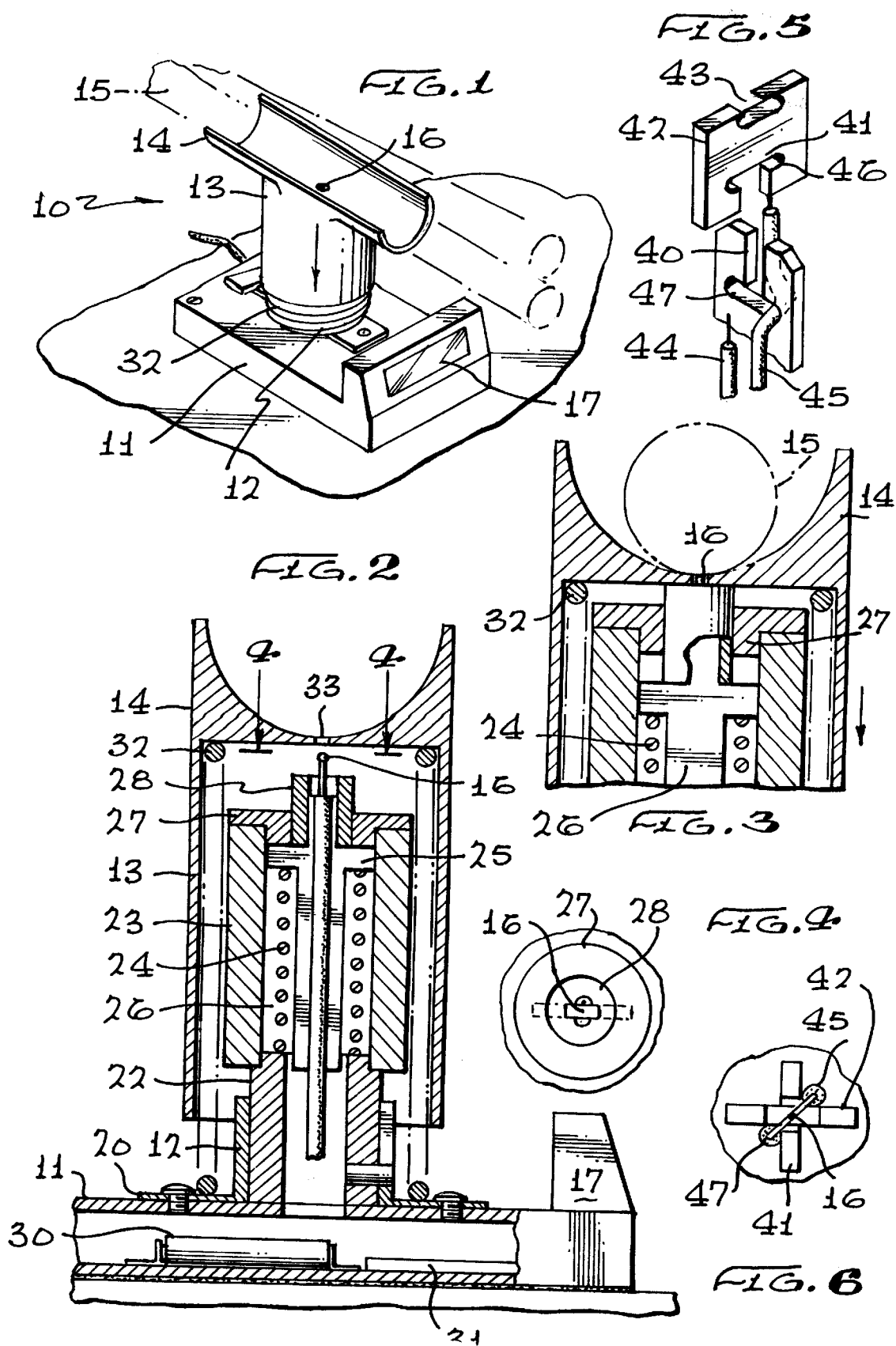

DUAL PROTECTED INSTANT TEMPERATURE DETECTOR

Priority based on Ser. No. 60-070,548 filed Jan. 6, 1998

BACKGROUND OF THE INVENTION

1. Field of the Invention

The present invention relates to the field of beautician accessories and aids, and more particularly to a novel temperature sensing cradle for supporting heated curling iron, which includes a thermocouple sensing element as well as a visual temperature read-out display.

2. Brief Description of the Prior Art

In the past, it has been the conventional practice for a beautician to employ a heating curling iron for supplying heat to a customer's hair in order to provide a particular hairdo or coiffure. In this procedure, the curling iron must be of a particular temperature or certainly within a temperature rang in order to be effective. Should the curling iron be of a more elevated temperature, the iron becomes dangerous in the event that the iron touches the scalp or skin of the customer. Damage to the scalp, skin or other injury may result.

Attempts have been made to determine the suitable temperature of the curling iron which generally embraces primitive methods such as momentarily touching the iron or placing a small amount of water on the iron to check evaporation. These methods may provide some intuitive knowledge concerning the temperature of the curling iron but they certainly do not avoid problems dealing with overheated irons.

Therefore, a long-standing need has existed to provide a means for checking the temperature of the curling iron and to support the curling iron in a heated condition so that it will be ready for use by the beautician.

SUMMARY OF THE INVENTION

The above problems and difficulties are avoided by the present invention which provides a novel temperature detector for a curling iron which resides in providing a base for supporting a stand which includes a cradle having an elongated open channel for supporting a heated curling iron. The cradle is resiliently carried on a post so that the cradle can move up and down over the terminating end of the post. The terminating end of the post includes a thermocouple which projects into and through an orifice in the cradle when the cradle is in the depressed or down position. Thus, the temperature of the heating iron residing in the cavity of the cradle can be sensed by the thermocouple. Additionally, the base includes support for a visual read-out display of the temperature sensed by the thermocouple and circuit means interconnects the display with the thermocouple. Furthermore, the thermocouple is protected from destruction or damage by the curling iron in the cradle by providing a resilient mount for the thermocouple within the post.

Therefore, it is among the primary objects of the present invention to provide a novel heat protection and sensing means for a curling iron which takes the form of a cradle and thermocouple arrangement with a digital read-out to display temperature readings.

Another object of the present invention is to provide a novel cradle for supporting a heated curling iron which includes means for sensing the temperature of the curling iron and which is protected from damage by the weight of the curling iron coming into contact with the temperature sensing device.

Still a further object of the present invention is to provide a novel temperature sensing and read-out device for determining the temperature of a hair curling iron which does not damage the sensing element or the iron itself.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front perspective view of the novel dual protected instant temperature detector of the present invention which incorporates the present invention;

FIG. 2 is an enlarged longitudinal cross-sectional view of the detector shown in FIG. 1;

FIG. 3 is an enlarged fragmentary sectional view of the detector shown in FIG. 2 with the cradle being in an alternate position;

FIG. 4 is a sectional view, taken in the direction of arrows 4—4 of FIG. 2;

FIG. 5 is an exploded perspective view illustrating the components for supporting the temperature sensing device; and FIG. 6 is a plan view showing the temperature sensing device supported by the components shown in FIG. 5.

DESCRIPTION OF THE PREFERRED EMBODIMENT

Referring to FIG. 1, the novel dual protected instant temperature detector of the present invention is illustrated in the general direction of arrow 10 and includes a base 11 having a movable support comprising a post 12 on which a sliding sleeve 13 is mounted. The top end of sleeve 13 includes a tray or cradle 14 having open ends and an open top so as to receive a heated hair curling iron shown in broken lines by numeral 15. The cradle 14 includes an opening between its opposite ends for insertably receiving a thermocouple 16 which senses the temperature of the iron 15 when it is resting in the cradle. The cradle and sleeve 13 move in a rectilinear direction up and down on the post 12 since it is spring-biased in order to permit advancement of the thermocouple 16 into and out of the hole in the cradle.

The base 11 further includes a display 17 for visually indicating the temperature of the iron 15 while it is resting in the cradle 14. The circuitry for the display 17 is included within the base 11 and is suitably connected to the thermocouple 16 for operation. The iron may also be removed from the cradle and placed into the oven and it's temperature tested by placing the cradle 14 in close proximity to or touching with the thermocouple 16.

Referring now in detail to FIG. 2, it can be seen that the post 12 includes a pair of flanges 20 and 21 which mount onto the top surface of the base 11 by suitable means such as screws or the like. The post 12 encircles a collar 22 having an open-ended bore and the top end of which serves to mount a cylinder 23 as well as supporting the bottom end of a coil spring 24. The upper end of spring 24 bears against the underside of the flange 25 carried on a slide member 26 which passes through the center of the coil spring 24. The portion which passes through the bore is of a major longitudinal length. The upper surface of the flange 25 supports a collar 27 which, in turn, supports a ring 28. The ring has an open-ended bore with a fixture at its top for supporting the thermocouple 16. The thermocouple is held in position by means of lead wires which come from opposite sides of the thermocouple and are covered by insulation along its major length on opposite sides of the slide 26 and progress through the open bore of cylinder 23 and element 22 for connection to electronic components within the base 11. Such components may include electrical component 30 and a circuit board or the like 31. Suitable connections are made with the display unit 16 from these components.

It can also be seen in FIG. 2 that the sleeve 13 is resiliently carried on the base 12 by means of a helical spring 32 which bears against the flanges of the base at one end and progresses between the inside of the sleeve and the outside of cylinder 23. The spring 32 terminates at its top against the underside of the cradle 14 at the juncture of the sleeve therewith. In FIG. 2, the cradle and sleeve are shown in an elevated position so that the thermocouple 16 is in alignment with but has not been inserted through an opening 33 in the bottom of the tray. In this condition, the heated curling iron 15 is removed from the tray. However, when the iron is placed into the cradle of tray 14, the weight of the iron causes the spring 32 to collapse so that the thermocouple 16 enters and passes into the hole 33. However, the thermocouple is protected from damage due to the weight or engagement with the underside of the thermocouple by the resilience of spring 24 which compresses at the contact of the thermocouple with the iron.

FIG. 3 shows the alternate position just described above where the weight of the iron has caused the cradle and sleeve to move downwardly against the expansion of spring 32 so that the thermocouple 16 passes into the hole 33. When the thermocouple touches the underside of the iron 15, the spring 24 will compress so that the thermocouple is protected.

With respect to FIGS. 5 and 6, an alternate mounting for the thermocouple is illustrated wherein the top of the slider 26 includes a cutout 40 for insertably receiving the central portion 41 of a top element 42. The top element includes a cup-like structure 43 into which the thermocouple is mounted and held in position. The leads from the thermocouple are represented by numerals 44 and 45 and are passed or trained through openings in the top element 42 or the top of the slider as indicated by numerals 46 and 47 respectively. The leads can be trained in alternate positions, if desired. However, the slots and openings, such as 46 and 47, are available to hold the leads in a relative fixed position so that the thermocouple remains in the cup 43.

Therefore, it can be seen that the thermocouple is protected when the weight of the iron is bearing thereagainst. The temperature of the iron is displayed on the display 17. The dual aspect of protection is provided by the coaxially disposed springs 24 and 32 which cooperate to move the thermocouple assembly, including the cylinder 23, slider 26 and the thermocouple upwardly in alignment with the hole 33 while the pressure against the thermocouple will slightly compress the spring. The spring 32 normally biases the sleeve and cradle upward from the base 11 while permitting the weight of the iron to compress the spring 32 so that the thermocouple will pass into the opening 33.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A temperature detector comprising:

a base;

a cradle resiliently mounted on said base for rectilinear movement;

said cradle having a centrally located opening;

a heat sensing device resiliently mounted on said base and having a tip aligned with said cradle opening; and said tip disposed to yieldably pass through said opening for a heat sensing operation and for passage from said opening to a storage condition.

2. The temperature detector defined in claim 1 wherein:

said cradle includes an exterior sleeve enclosing an internal sleeve; and said resiliently mounted heat sensing device carried on said internal sleeve and coaxial therewith.

3. The temperature detector defined in claim 2 including:

a weighted object removably carried on said cradle for moving said cradle over said heat sensing device to urge said tip through said opening into engagement with said weighted object.

4. A temperature detector comprising:

a base;

a movable support mounted on said base;

a cradle carried on said support and having an opening midway between its opposite ends;

a heat sensing device movably mounted on said support and having a tip projecting through said opening;

resilient means disposed on said support for movably reciprocating said heat sensing device along a linear path for introducing said tip to said opening and for withdrawing said tip from said opening;

said support having a stationary element fixed to said base and a sleeve movably carried on said element;

said resilient means disposed between said element and said sleeve; and said heat sensing device secured to said sleeve so as to move therewith for yieldably projecting said tip through said opening and a second sleeve movably mounted over said first mentioned sleeve;

said cradle secured to said second sleeve; and a second resilient means disposed between said base and said second sleeve wherein said cradle is normally raised above said tip.

5. The temperature detector defined in claim 4 including;

a weighted object removably disposed on said cradle; and said heat sensing device being responsive to engagement of said weighted object with said tip to withdraw said tip from said opening against opposition of said resilient means.

* * * * *